Sept. 22, 1931.  A. T. STOCK  1,823,920

GASKET

Filed Feb. 6, 1926

Inventor
Anthony T. Stock
By Spencer, Sewall & Hardman
Attorneys

Patented Sept. 22, 1931

1,823,920

UNITED STATES PATENT OFFICE

ANTHONY T. STOCK, OF DAYTON, OHIO, ASSIGNOR, BY MESNE ASSIGNMENTS, TO FRIGIDAIRE CORPORATION, A CORPORATION OF DELAWARE

GASKET

Application filed February 6, 1926. Serial No. 86,597.

This invention relates to improvements in gaskets and particularly gaskets intended to be used in high pressure devices or such devices which contain a medium which would attack and cause disintegration of ordinary gaskets.

One of the objects of the present invention is to provide a gasket which will readily adjust itself to any imperfections in the surfaces between which it is placed and still maintain a leak-proof joint.

Another object is to so shape the gasket that any portion thereof may readily be displaced by the crushing effect of two imperfectly surfaced members being clamped together, whereby a substantially perfect seal is provided between said members.

A still further object is to provide a gasket which will prevent distortions of either of the members between which it is clamped.

Further objects and advantages of the present invention will be apparent from the following description, reference being had to the accompanying drawings, wherein a preferred form of embodiment of the present invention is clearly shown.

Figure 1:
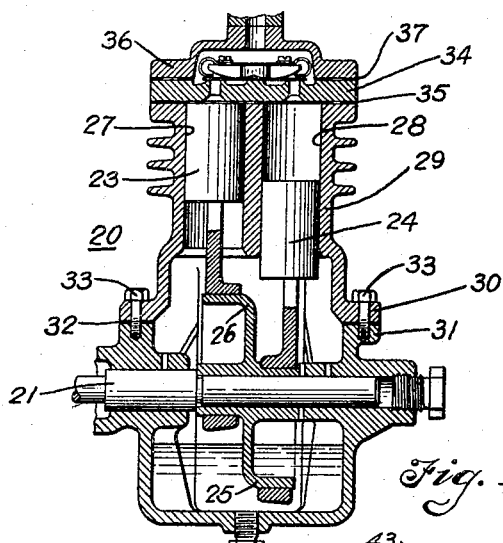
Fig. 1 is a sectional view of a compressor on which the gasket is used.
Figure 2:
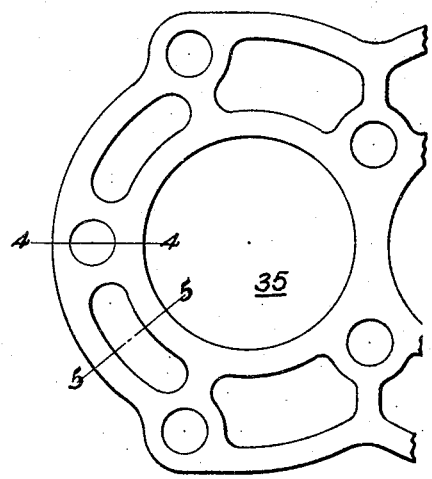
Fig. 2 is a fragmentary view showing one portion of a double cylinder gasket.

Referring to the drawings, the numeral 20 designates a compressor adapted to be used in a refrigeration system wherein sulphur dioxide is used as a refrigerant. The compressor has a crank case provided with the crank shaft 21 which is adapted to operate the compressor pistons 23 and 24 by means of crank throws 25 and 26 respectively.

Pistons 23 and 24 move in cylinders 27 and 28 respectively, formed in the cylinder block 29. This block is provided with a flange 30 which fits upon a correspondingly shaped flange 31 formed on the crank case. A gasket 32 is interposed between the cylinder block and crank case, these members being securely held together by means of bolts 33.

A valve block 34 is provided with suitable check valve mechanism. This valve block is secured to a flange formed on the end of the cylinder block, having the gasket 35 interposed between said valve and cylinder blocks. A cylinder head 36 and gasket 37 are secured to the valve block 35.

Figure 3:
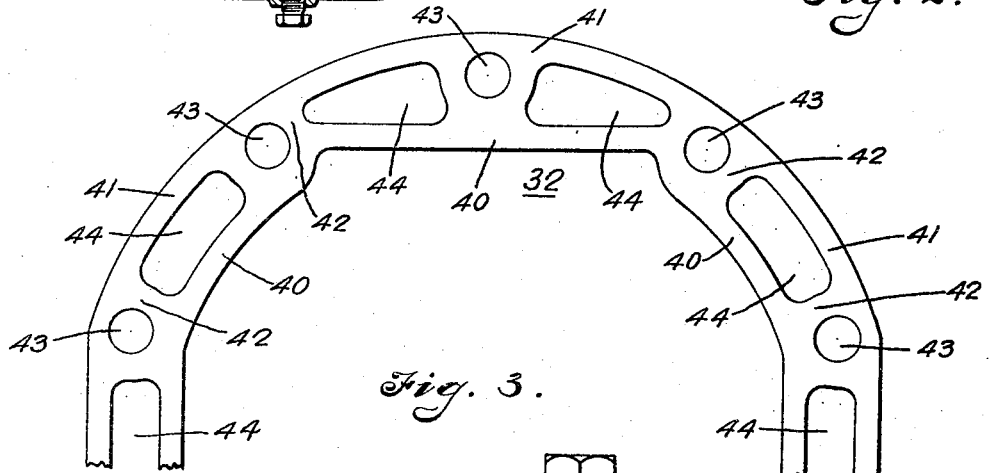
Fig. 3 is a fragmentary view of a gasket adapted to be used between the cylinder and crank case of the compressor shown in Fig. 1.
Figure 4:
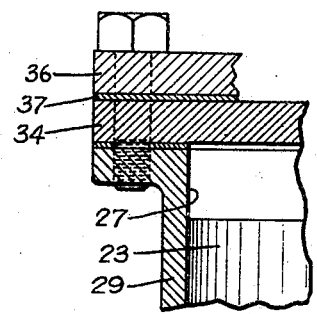
Fig. 4 is a section thru a compressor cylinder and gasket adjacent one of the clamping bolts.

In the Fig. 3 there is shown a fragmentary flat view of the gasket 32 to be positioned between the crank case and cylinder block. The portion 40 of this gasket may be designated as the sealing portion while 41 may be called a spacer portion. Both these portions are tied together by pairs of webs 42 which enclose apertures 43 for receiving the clamping bolts 33. The web portions form apertures or perforations 44 between adjacent pairs of webs. By referring to the Fig. 3 it may be seen that the width of the material in either the sealing, spacer or web portions is substantially equal, and of course, the thickness of all portions of the gasket is uniform. The cross-sectional area of all of these portions is substantially the same. Thus when said gasket is clamped between two adjacent members the flow of the metal under the influence of pressure caused by the clamping means will tend to be uniform over the entire gasket. The gasket 35 is substantially like the gasket 32, the former however being double and adapted to fit between the valve and cylinder blocks.

It has been found from actual practice that where gaskets constructed in accordance with the present invention are used, for example between cast iron parts of compressors as above described, the warping of the compressor parts heretofore experienced has been eliminated to a very large extent.

Various fibrous materials have been used as well as metallic substances in making up gaskets of this kind and the metallic gaskets have proven superior in withstanding the deteriorating effect of sulphur dioxide.

The metallic gasket may be made up of lead solder of composition varying from 10% tin and 90% lead to 90% tin and 10% lead. The most desirable composite gasket contains approximately 50% tin and 50% lead.

Such material provides a gasket wholly of a relatively soft, plastic, composite metal which, when clamped between surfaces having imperfections, will conform to such imperfections and provide a substantially leakproof joint. Where high spots are present in said surfaces the pressure exerted by the clamping together of such surfaces will displace the metal in the gasket, such displacement being possible due to the apertures 44 surrounded by material having approximately equal cross-sectional areas.

This type of gasket may be made by stamping and perforating the gasket from a sheet of material of proper thickness. This is done with dies and it is desirable to have the die shapes as simple as possible. It may be that in some cases the die shape is unduly complicated if the gasket is made so that the portions between the adjacent perforations and the portions between the perforations and the edges are of absolutely uniform cross-sectional area. In such cases I find that the uniformity may be slightly departed from without departing from the spirit of the invention and I prefer to do this where it results in simplicity of die structure.

While the form of embodiment of the present invention as herein disclosed, constitutes a preferred form, it is to be understood that other forms might be adopted, all coming within the scope of the claims which follow.

What is claimed is as follows:

1. A gasket made wholly of a plastic metal and having a central opening and a plurality of perforations arranged in spaced relation about said opening so as to provide portions of approximately equal cross-sectional area between adjacent perforations and between the perforations and edges of the gasket.

2. A gasket having an opening and made wholly of plastic metal comprising in combination, a sealing portion surrounding the opening; a spacer portion also surrounding the opening and being of substantially the same width and thickness as the sealing portion; and web portions connecting the sealing and spacer portions, said web portions having substantially the same cross-sectional area as the combined cross-sectional areas of the sealing and spacer portions.

In testimony whereof I hereto affix my signature.

ANTHONY T. STOCK.